July 22, 1930.    J. W. BEGGS    1,771,072
VEHICLE TRANSMISSION
Filed Jan. 10, 1929
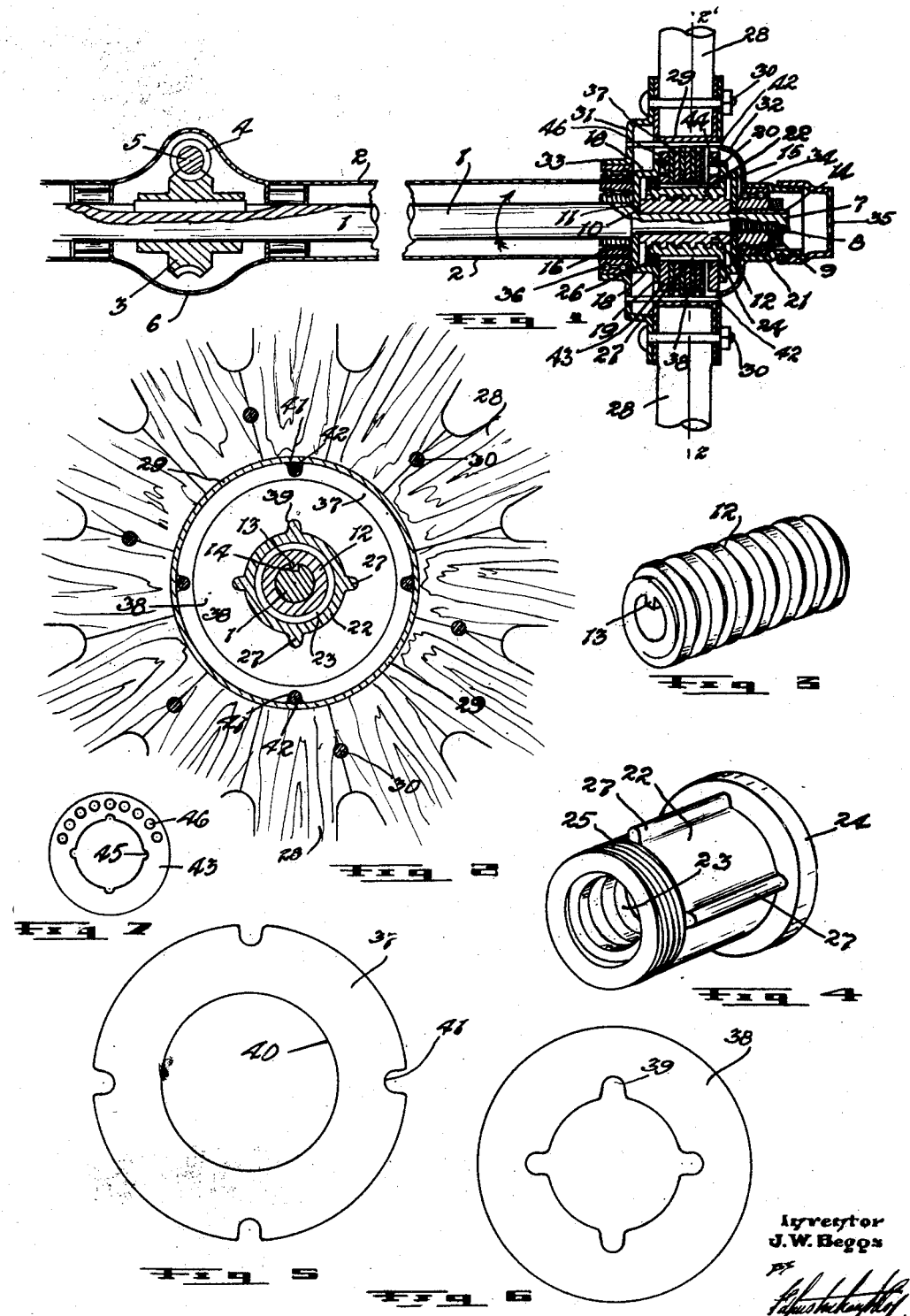
Inventor
J. W. Beggs Patented July 22, 1930

1,771,072

UNITED STATES PATENT OFFICE

JOSEPH W. BEGGS, OF WINNIPEG, MANITOBA, CANADA

VEHICLE TRANSMISSION

Application filed January 10, 1929. Serial No. 331,409.

The invention relates to improvements in vehicle transmission and an object of the invention is to provide a transmission having no differential and wherein one or both the driving wheels, upon the driven shaft being rotated in either direction, are automatically frictionally coupled to the axle, thus insuring of the positive driving of the vehicle under all conditions.

A further object is to provide a common driven drive shaft for the wheels, thus dispensing with the present used complicated differential drive.

A further object is to provide a transmission arrangement wherein the wheels are automatically freed of the driving effect of the driving axle as would occur when the wheels are rotating faster than the axle such as when coasting.

A further object of the invention is to construct the device in a simple, durable and inexpensive manner and such that the various parts can be readily assembled or dismounted as occasion demands and such that replacements can be readily made.

A further object is to construct the transmission such that the parts utilized in conjunction with one of the wheels are identical to those utilized in conjunction with the other of the wheels.

With the above more important and other minor objects in view which will become more apparent as the description proceeds, the invention consists essentially in the arrangement and construction of parts hereinafter more particularly described, reference being had to the accompanying drawing, in which:—

Fig. 1 is a vertical sectional view centrally through one end of the rear axle of an automobile equipped with my invention.

Fig. 2 is a vertical sectional view at 2—2' Figure 1.

Fig. 3 is a perspective view of the worm.

Fig. 4 is a perspetive view of the sleeve which receives the worm.

Fig. 5 is a face view of one of the large friction rings.

Fig. 6 is a face view of one of the smaller friction rings.

Fig. 7 is a face view of one of the weighted rings.

In the drawing like characters of reference indicate corresponding parts in the several figures.

The rear axle 1 of an automobile extends from wheel to wheel and is contained in the axle housing 2. Means is provided for rotating the axle, such being herein shown as a worm wheel 3 secured centrally to the axle and driven by a worm 4 at the rear end of the transmission shaft 5, the latter parts being suitably housed in a gear casing 6.

I have not considered it necessary to enter into a detailed description of the manner in which the shaft 5 is driven as said shaft conforms to the customary transmission shaft and is driven in the forward and reverse directions in the usual manner, the drive being controlled by the usual gear shift lever not herein shown.

On each end of the axle 1, a rear wheel is mounted and the driving arrangement between the axle and the wheels is the same in both instances and accordingly it is unnecessary to duplicate their description. The end of the axle is reduced and terminates in a spindle 7 of predetermined length and the spindle has the outer end thereof screw threaded as indicated at 8 to receive the retaining nut 9. The inner end of the spindle is stepped to provide two shoulders 10 and 11 and on the spindle I mount a worm 12 which is provided internally with a feather 13 which enters a longitudinal slot 14 provided in the spindle. The inner end of the worm butts the shoulder 10 and the feather causes the worm to turn with the axle.

On the spindle at the ends of the worm, I mount an outer disc 15 and an inner disc 16, the disc 16 engaging the shoulder 11 and being frictionally held in place by the adjacent end of the worm. Both of these discs are provided with inturned rims 18 and the rims carry outstanding friction flanges 19 and 20 respectively which are opposed. It will be observed that the diameter of the rims is somewhat greater than the diameter of the worm, the ends of which they overlie. A ball bearing 21 of any approved type is mounted on the outer end of the spindle between the retaining nut 9 and the outer disc and obviously when the nut is tightened up, the parts previously described are all held tightly in place.

On the worm I mount a sleeve 22 which is provided with internal threads 23 receiving those of the worm, the arrangement being such that an endwise movement of the sleeve can be effected by turning the worm provided the sleeve is prevented from rotating therewith. The sleeve has a length somewhat less than the distance between the discs so that clearance space is reserved to permit of the endwise shifting of the sleeve as just explained. The outer end of the sleeve terminates in an outstanding flange 24 contained within the rim of the outer disc and the other end of the sleeve is screw threaded as indicated at 25 and receives a nut 26 which is received within the rim of the inner disc. The outer face of the sleeve is fitted with a plurality of equi-spaced longitudinally extending ribs or guides 27, the ribs extending between the flange 24 and the applied nut 26. In practice the nut 26 is screwed up until it is jammed against the exposed ends of the ribs, this serving to hold the nut tightly in place.

The spokes 28 of the wheel are of ordinary construction and have their inner ends received within a flanged drum 29, there being bolts 30 provided which pass through the spokes and fasten the same to the drum flanges. To the flanges of the drum, I fasten also by the bolts 30 inner and outer cover plates 31 and 32, the cover plate 31 having the inner edge thereof terminating in a sleeve 33 enveloping the axle housing whilst the cover plate 32 has the inner edge thereof terminating in an outwardly extending sleeve 34, the outer end of which is screw threaded to receive the hub cap 35. The ball bearings 21 hereinbefore mentioned appear between the sleeve 34 and the axle. Further ball bearings 36 are interposed between the sleeve 33 and the axle housing and accordingly the wheel is rotatably carried at the one side by the axle and at the other side by the axle housing.

On the sleeve 22 I mount a series of relatively large friction rings 37 and a series of relatively smaller friction rings 38 which are alternated in position as best shown in Figure 1, the smaller rings having a less diameter than the larger rings so that the larger rings have their outer edges projecting beyond the outer edges of the smaller rings. Each of the smaller rings is provided at its inner edge with a plurality of cross slots 39 and these slots receive slidably the ribs 27 so that the said friction rings are compelled to turn with the sleeve but are free to slide endwise thereof. Each of the larger friction rings has the central circular opening 40 therein of such diameter that the said rings fit over or ride the ribs 27 and the outer edge of each large friction ring is supplied with a plurality of suitably spaced cross slots 41.

Suitably spaced guides 42 in the form of cross rods are carried by the cover plates 31 and 32 within the drum 29 and these guides pass through the aligned slots 41 of the larger rings and are entirely free of the outer peripheries of the smaller rings. Between the outer friction discs and the friction flanges, I locate similar weighted rings 43 and 44 which are much thicker and consequently heavier than the other rings. These weighted rings are both mounted on the sleeve and are provided with slots 45 similar to those 39 to receive the ribs 27. Further the weighted rings are provided with a series of holes 46, this making them light at the top and heavy at the bottom. They will accordingly function to prevent the sleeve turning with the worm.

It will here be particularly observed that the series of friction rings and the weighted rings are positioned on the sleeve between the flange 24 and the nut 26 and are also located between the friction flanges 19 and 20. Accordingly if the sleeve 22 be caused to move inwardly by the rotation of the worm, the friction rings will be jammed between the friction flange 19 and the flange 24 whereas if the sleeve be caused to move in the reverse direction, the rings will be jammed between the nut 26 and the friction flange 20. In either jammed position of the rings, the wheel will be caused to rotate with the axle in a forward or a reverse direction.

In order that the invention may be better understood, I will assume that an automobile equipped with my invention is initially standing still and that the operator desiring to move ahead causes the axle 1 to be driven in the direction indicated by the applied arrow, Figure 1. As the axle turns, the worm at each end is rotated but owing to the weighted discs, the sleeve will not turn with the worm. Accordingly the sleeve will be compelled to end shift outwardly and the out shifting effects the subsequent jamming of the rings between the nut 26 and the friction flange 20 and the instant this occurs, the wheel is caused to rotate with the axle and will continue to rotate with the axle as long as the axle is driven in that direction provided the speed of rotation of the wheel at any time does not become greater than the speed of rotation of the axle such as would occur when turning a corner.

The action when the axle is driven in the other or reverse direction is the same as above described with the exception that the sleeve will end shift in the opposite direction and the rings will be jammed between the flange 24 and friction flange 19.

When an automobile equipped with this drive, makes a turn such as at a corner, the inner wheel or that traversing the least distance will be driven by the axle and the outer wheel or that traversing the greater distance will be free of the axle, this being for the reason that at such time the axle is rotating slower than the outer wheel and such a variation in the speeds effects the shifting of the sleeve associated with such wheel to a neutral position which is a position where the rings are not held frictionally engaged.

What I claim as my invention is:—

1. The combination with a driven axle having the end terminating in a spindle, of a worm secured to and rotating with the spindle, inner and outer discs located at the ends of the worm and rotating therewith and presenting opposing friction flanges, a sleeve screw threading on the worm and of a length permitting of its endwise movement between the discs, said sleeve being provided with opposing end flanges and suitably spaced longitudinally guides between the flanges, a rotatably mounted wheel, a series of alternated large and small friction rings mounted on the sleeve and contained within the wheel, the small rings being provided with cross slots to receive the guides aforesaid and the large rings having their peripheries cross slotted and guides secured to the wheel and passing slidably through the latter cross slots.

2. The combination with a driven axle terminating in an end spindle and an axle housing, of a worm mounted on the spindle and rotating therewith, inner and outer friction flanges secured to the spindle to rotate therewith and positioned at the ends of the worm, a sleeve screw threading on the worm and endwise shiftable thereon, said sleeve having the ends thereof provided with outstanding flange forming members and with exterior ribs extending between such flange forming members, inner and outer cover plates, the inner cover plate being rotatably mounted on the axle housing and the outer cover plate on the outer end of the spindle, a wheel carried by the cover plates, said wheel being freely rotatable around the sleeve, alternated sets of large and small friction rings mounted on the sleeve and extending between the friction flanges, said smaller rings being provided with cross slots receiving the ribs aforesaid and said larger rings having their peripheries cross slotted and guides permanently carried by the cover plates and passing slidably through the latter slots.

3. The combination with a driven axle terminating in an end spindle and an axle housing, of a worm mounted on the spindle and rotating therewith, inner and outer friction flanges secured to the spindle to rotate therewith and positioned at the ends of the worm, a sleeve screw threading on the worm and endwise shiftable thereon, said sleeve having the ends thereof provided with outstanding flange forming members and with exterior ribs extending between such flange forming members, inner and outer cover plates, the inner cover plate being rotatably mounted on the axle housing and the outer cover plate on the outer end of the spindle, a wheel carried by the cover plates, said wheel being freely rotatable around the sleeve, alternated sets of large and small friction rings mounted on the sleeve and extending between the friction flanges, said smaller rings being provided with cross slots receiving the ribs aforesaid and said larger rings having their peripheries cross slotted, guides permanently carried by the cover plates and passing slidably through the latter slots and weighted rings interposed between the outermost friction rings and the flange forming members.

4. In combination, a driven axle having the end thereof terminating in a spindle and doubly shouldered at the inner end of the spindle, an axle housing, bearings interposed between the housing and the axle, a worm mounted on the spindle to rotate therewith, the inner end of the worm being butted against one of the shoulders, an inner disc mounted on the spindle and jammed between the other shoulder and the end of the worm, said inner disc being provided with a friction flange, an outer disc mounted on the spindle at the outer end of the worm and providing a friction flange opposing the former flange, an outer bearing mounted on the spindle to the outer side of the outer disc, a jam nut applied on the outer end of the spindle against the latter bearing, a sleeve screw threaded on the worm and provided at the ends with outstanding flanges contained within the friction flanges and with longitudinal exterior ribs, said sleeve being endwise shiftable on the worm between the discs, alternated large and small friction rings mounted on the sleeve between the friction flanges of the discs, the small rings being cross slotted to slidably receive the ribs aforesaid and the large rings being provided with aligned cross slots at their peripheries, weighted rings interposed between the outermost friction rings and the friction flanges, inner and outer cover plates, the inner cover plate being rotatably mounted on the axle housing and the outer cover plate being rotatably carried by the outer bearing aforesaid, a wheel carried by the cover plates and guide members connecting the cover plates and passing slidably through the slots in the large friction rings.

5. In combination, a driven axle having the end thereof terminating in a spindle and doubly shouldered at the inner end of the spindle, an axle housing, bearings interposed between the housing and the axle, a worm mounted on the spindle to rotate therewith, the inner end of the worm being butted against one of the shoulders, an inner disc mounted on the spindle and jammed between the other shoulder and the end of the worm, said inner disc being provided with a friction flange, an outer disc mounted on the spindle at the outer end of the worm and providing a friction flange opposing the former flange, an outer bearing mounted on the spindle to the outer side of the outer disc, a jam nut applied on the outer end of the spindle against the latter bearing, a sleeve screw threaded on the worm and provided at the ends with outstanding flanges contained within the friction flanges and with longitudinal exterior ribs, said sleeve being endwise shiftable on the worm between the discs, alternated large and small friction rings mounted on the sleeve between the friction flanges of the discs, the small rings being cross slotted to slidably receive the ribs aforesaid and the large rings being provided with aligned cross slots at their peripheries, weighted rings interposed between the outermost friction rings and the friction flanges, a flanged drum surrounding the friction rings to clear the same, a wheel carried by the drum, inner and outer cover plates secured to the drum, the inner cover plate being rotatably mounted on the axle housing and the outer cover plate on the outer bearing aforesaid and cross rods connecting the cover plates within the drum and extending slidably through the cross slots of the larger friction rings.

Signed at Winnipeg this 7th day of December, 1928.

JOSEPH W. BEGGS.